(12) United States Patent
Oroskar et al.

(10) Patent No.: US 10,333,649 B1
(45) Date of Patent: Jun. 25, 2019

(54) SELECTION OF MODULATION AND CODING SCHEME (MCS) BASED ON PACKET LENGTH

(71) Applicant: Sprint Spectrum L.P., Overland Park, KS (US)

(72) Inventors: Siddharth S. Oroskar, Overland Park, KS (US); Jasinder P. Singh, Olathe, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 160 days.

(21) Appl. No.: 15/208,398

(22) Filed: Jul. 12, 2016

(51) Int. Cl.
*H04L 1/00* (2006.01)
*H04W 72/08* (2009.01)

(52) U.S. Cl.
CPC ......... *H04L 1/0009* (2013.01); *H04W 72/085* (2013.01)

(58) Field of Classification Search
CPC ............................ H04L 1/0009; H04W 72/085
See application file for complete search history.

(56) References Cited

U.S. PATENT DOCUMENTS

| | | | |
|---|---|---|---|
| 2010/0023830 A1* | 1/2010 | Wengerter | H04L 1/0025 714/748 |
| 2010/0067367 A1* | 3/2010 | Choi | H04L 5/0064 370/210 |
| 2011/0281614 A1 | 11/2011 | Kitahara | |
| 2014/0153546 A1* | 6/2014 | Kim | H04W 48/18 370/332 |
| 2015/0087351 A1* | 3/2015 | Majjigi | H04W 52/52 455/522 |
| 2016/0227005 A1* | 8/2016 | Kwon | H04L 69/324 |

OTHER PUBLICATIONS

Stefania Sesia et al., "LTE—The UMTS Long Term Evolution: From Theory to Practice," 2009, pp. 207-211.

\* cited by examiner

*Primary Examiner* — Zhensheng Zhang

(57) ABSTRACT

One or more packets to be transmitted to or from a user equipment (UE) device are determined to have a particular packet length, e.g., based on a vocoder to be used for a voice over Long Term Evolution (VoLTE) call. An initial modulation and coding scheme (MCS) is selected for transmission of the packets based on channel conditions. The initial MCS is replaced by an alternative MCS having a lower efficiency than the initial MCS in response to a determination that the alternative MCS would require the same number of resource blocks to transmit a packet having the particular packet length as the initial MCS. One or more resource blocks are allocated for transmission of the one or more packets having the particular packet length using the alternative MCS. Indications of the allocated one or more resource blocks and the alternative MCS are transmitted to the UE.

15 Claims, 7 Drawing Sheets

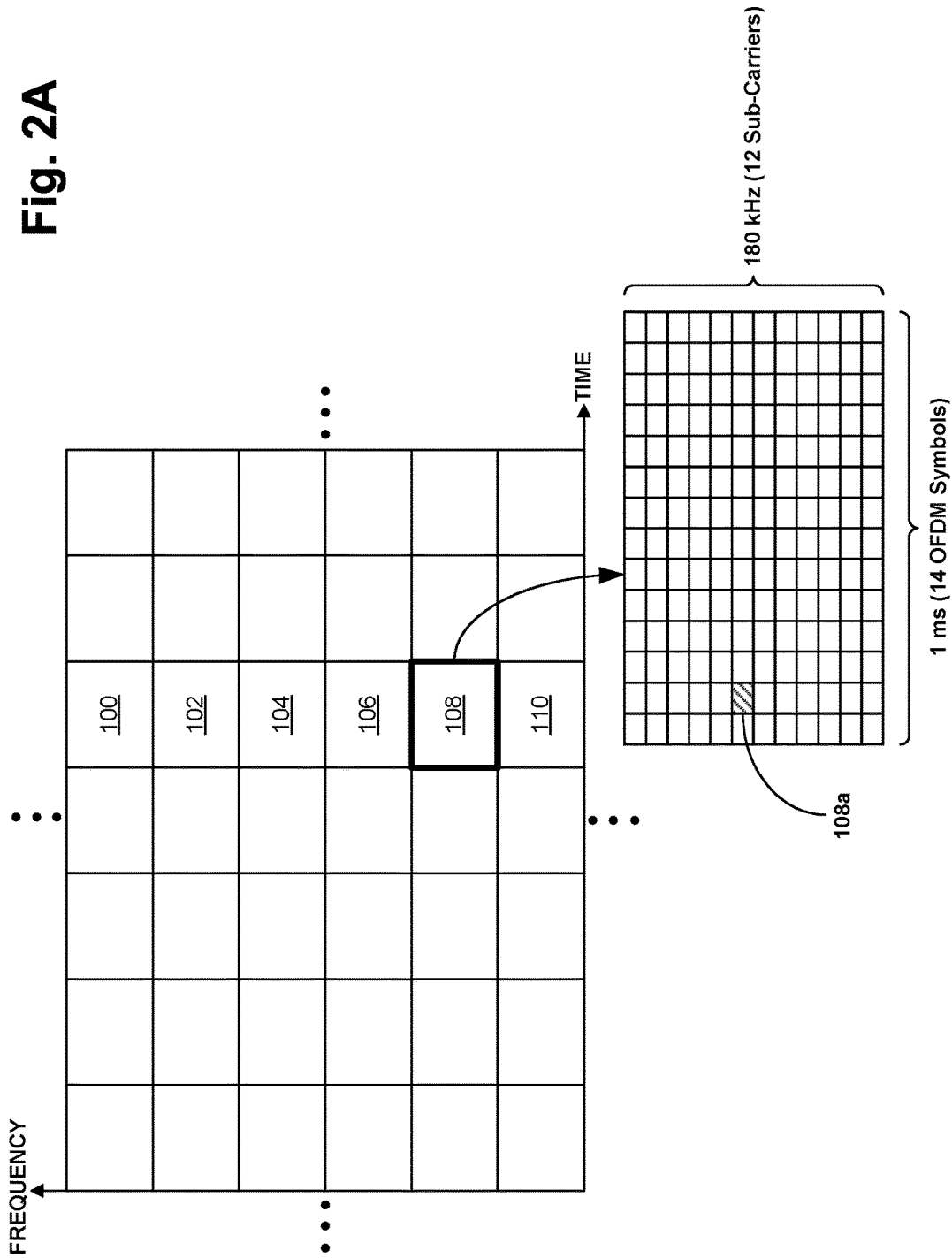

US 10,333,649 B1

SELECTION OF MODULATION AND CODING SCHEME (MCS) BASED ON PACKET LENGTH

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining a respective bandwidth of coverage, and each coverage area may define an air interface providing a downlink for carrying communications from the base station to UEs and an uplink for carrying communications from UEs to the base station. The downlink and uplink may operate on separate carriers or may be time division multiplexed over the same carrier(s). Further, the air interface may define various channels for carrying communications between the base station and UEs. For instance, the air interface may define one or more downlink traffic channels and downlink control channels, and one or more uplink traffic channels and uplink control channels.

In accordance with the Long Term Evolution (LTE) standard of the Universal Mobile Telecommunications System (UMTS), for instance, each coverage area of a base station may operate on one or more carriers spanning 1.4 MHz, 3 MHz, 5 MHz, 10 MHz, 15 MHz, or 20 MHz. On each such carrier used for downlink communications, the air interface then defines a Physical Downlink Shared Channel (PDSCH) as a primary channel for carrying user data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying user data from UEs to the base station, and a Physical Uplink Control Channel (PUCCH) for carrying control signaling from UEs to the base station.

In LTE, uplink and downlink air interface resources are mapped in the time domain and in the frequency domain. In the time domain, LTE defines a continuum of 10 millisecond (ms) frames, divided into 1 ms sub-frames and 0.5 ms slots. In the frequency domain, resources are divided into groups of 12 sub-carriers. Each sub-carrier is 15 kHz wide, so each group of 12 sub-carriers occupies a 180 kHz bandwidth. The 12 sub-carriers in a group are modulated together, using orthogonal frequency division multiplexing (OFDM), to form one OFDM symbol.

In LTE, uplink and downlink resources are typically allocated to individual UEs in blocks that may referred to as resource blocks. In the time domain, each resource block has a duration corresponding to one sub-frame (1 ms). In the frequency domain, each resource block consists of a group of 12 sub-carriers that are used together to form OFDM symbols. Typically, the 1 ms duration of a resource block accommodates 14 OFDM symbols, each spanning 66.7 microseconds, with a 4.69 microsecond guard band (cyclic prefix) added to help avoid inter-symbol interference.

The smallest unit of air interface resources is the resource element. Each resource element corresponds to one sub-carrier and one OFDM symbol. Thus, a resource block that consists of 12 sub-carriers and 14 OFDM symbols has 168 resource elements. Most of the resource elements in each resource block are available to carry user data. However, some of the resource elements are reserved for certain functions. For example, in each downlink resource block, a certain number of resource elements (e.g., 8 resource elements) are used to transmit reference signals, and a certain number of resource elements (e.g., resource elements in the first one to four OFDM symbols) are used for control channels.

Each resource element that carries user data provides a certain number of information bits, depending on the modulation and coding scheme (MCS) that is used. Each type of MCS includes a type of modulation and a type of coding that adds bits for error correction. The modulation determines the number of bits represented by each resource element. For instance, with Quadrature Phase Shift Keying (QPSK) modulation, each resource element represents 2 bits; with 16 Quadrature Amplitude Modulation (16QAM), each resource element represents 4 bits; and with 64 Quadrature Amplitude Modulation (64QAM), each resource element represents 6 bits. However, the number of information bits provided by a resource element is typically less than the number of bits represented by a resource element because of the additional bits that are added for error correction. For example, with 64QAM, each resource element represents 6 bits. However, the number of information bits provided by each resource element may range from about 2.730 to about 5.555, depending on the error correction coding that is provided by different MCSs. The number of information bits per resource element that is provided by an MCS is often described as the efficiency of the MCS.

A typical LTE implementation supports a range of MCSs with different efficiencies. For example, the supported MCSs may include MCSs that use QPSK modulation, with efficiencies ranging from about 0.152 to about 1.176, MCSs that use 16QAM modulation, with efficiencies ranging from about 1.477 to about 2.406, and MCSs that use 64QAM modulation, with efficiencies ranging from about 2.730 to about 5.555.

Typically, an MCS is selected for a resource block based on channel conditions. In general, higher-efficiency MCSs are selected when channel conditions are good and lower-efficiency MCSs are selected when channel conditions are poor. More particularly, the signal-to-noise ratio corresponding to particular channel conditions may result in different average error rates for different MCSs. To select an MCS for the particular channel conditions, the average error rates of the MCSs may be compared to a maximum acceptable error rate (i.e., an error rate that is deemed acceptable). The MCS with the highest efficiency that results in an average error rate that is less than or equal to the maximum acceptable error rate may then be selected.

OVERVIEW

In some cases, it may be possible to determine that one or more packets to be transmitted to or from a UE will each have a particular packet length. For example, the UE and the base station serving the UE may use a particular vocoder for a voice call, such as a voice over LTE (VoLTE) call. The length of each packet of voice data can then be calculated based on the voice coding rate of the particular vocoder and the type of header compression that is used. An MCS may be selected based on both the channel conditions and the particular packet length. For example, an initial MCS may be selected based on channel conditions by determining the highest-efficiency MCS that results in an average error rate that is less than or equal to a maximum acceptable error rate for those channel conditions. The initial MCS would require a particular number of resource blocks to transmit a packet having the particular packet length. However, if there is an alternative MCS with a lower efficiency than the initial MCS that would require the same number of resource blocks to transmit a packet having the particular packet length as the initial MCS, then the alternative MCS may be selected instead of the initial MCS. That is, resources may be allocated based on the alternative MCS, and the UE may be notified of the allocated resources and the alternative MCS. By using the alternative MCS instead of the initial MCS, the transmission of the packet can be made more robust (e.g., with a lower average error rate) while using the same quantity of air interface resources.

In one aspect, example embodiments provide a method for wireless communication using one or more resource blocks, wherein each resource block corresponds to a block of frequencies and time and has a predetermined number of resource elements. The method comprises: (a) determining that one or more packets to be transmitted to or from a user equipment device (UE) will each have a particular packet length; (b) selecting, from among a plurality of modulation and coding schemes (MCSs), an initial MCS for transmission of the one or more packets having the particular packet length based on channel conditions, wherein each MCS in the plurality of MCSs has a different efficiency with respect to information bits per resource element; (c) determining that the initial MCS would require a particular number of resource blocks to transmit a packet having the particular packet length; (d) making a determination that an alternative MCS in the plurality of MCSs that has a lower efficiency than the initial MCS would also require the particular number of resource blocks to transmit a packet having the particular packet length; (e) in response to the determination, replacing the initial MCS with the alternative MCS for transmission of the one or more packets having the particular packet length; (f) allocating one or more resource blocks for transmission of the one or more packets having the particular packet length using the alternative MCS; and (g) transmitting to the UE an indication of the allocated one or more resource blocks and an indication of the alternative MCS.

In another aspect, example embodiments provide a system for wireless communication using one or more resource blocks, wherein each resource block corresponds to a block of frequencies and time and has a predetermined number of resource elements. The system comprises a wireless communication interface; one or more processors; and data storage that stores program instructions executable by the one or more processors to cause the system to perform operations. The operations comprise: (a) determining that one or more packets to be transmitted to or from a user equipment device (UE) will each have a particular packet length; (b) selecting, from among a plurality of modulation and coding schemes (MCSs), an initial MCS for transmission of the one or more packets having the particular packet length based on channel conditions, wherein each MCS in the plurality of MCSs has a different efficiency with respect to information bits per resource element; (c) determining that the initial MCS would require a particular number of resource blocks to transmit a packet having the particular packet length; (d) making a determination that an alternative MCS in the plurality of MCSs that has a lower efficiency than the initial MCS would also require the particular number of resource blocks to transmit a packet having the particular packet length; (e) in response to the determination, replacing the initial MCS with the alternative MCS for transmission of the one or more packets having the particular packet length; (f) allocating one or more resource blocks for transmission of the one or more packets having the particular packet length using the alternative MCS; and (g) transmitting to the UE, via the wireless communication interface, an indication of the allocated one or more resource blocks and an indication of the alternative MCS.

BRIEF DESCRIPTION OF THE DRAWINGS

FIG. 2A is an illustration of a division of a shared downlink channel into downlink resource blocks, in accordance with an example embodiment.

DETAILED DESCRIPTION

1. Introduction

Figure 1:
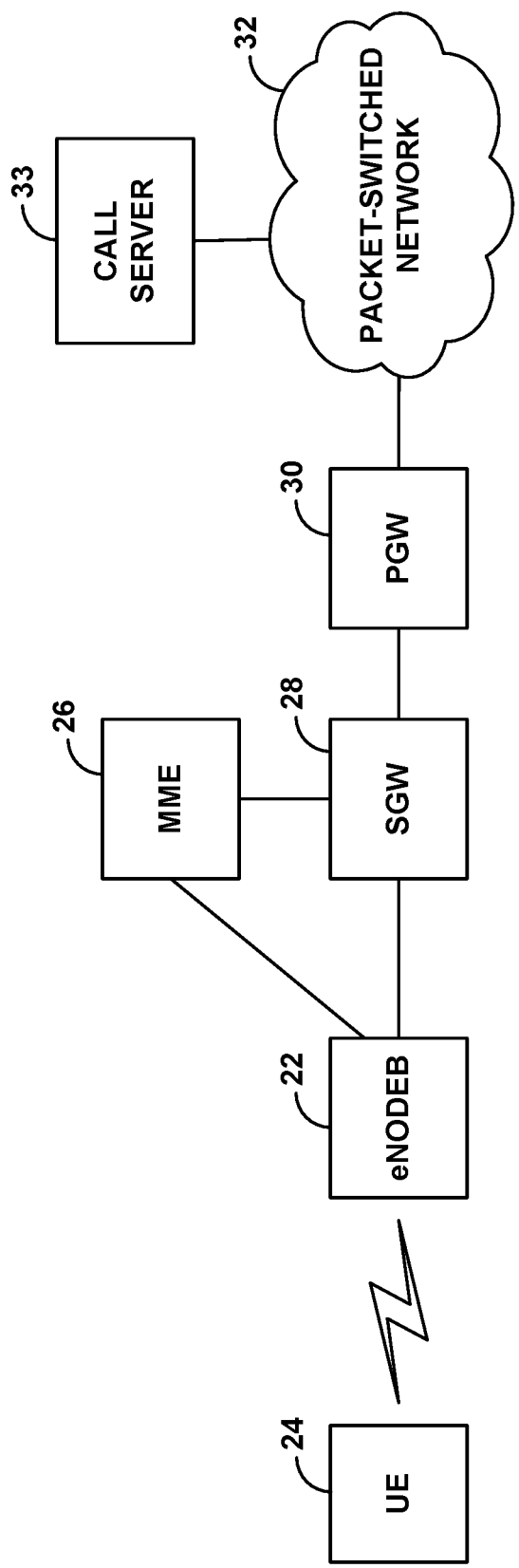
FIG. 1 is a simplified block diagram of an example wireless communication system in which embodiments of the present disclosure can be implemented.

Conventionally, an MCS is selected from among a plurality of supported MCSs based on channel conditions, such that the selected MCS is the highest efficiency MCS (with regard to information bits per resource element) that results in an average error rate for the channel channels for those channel conditions that is less than or equal to a maximum acceptable error rate. For example, a UE may report downlink channel conditions to the base station in the form of a Channel Quality Indicator (CQI) index that ranges from 1 to 15. Each CQI index maps to a corresponding MCS in a set of 15 supported MCSs as being the highest efficiency MCS that does not exceed the maximum acceptable error rate for the particular downlink channel conditions represented by the CQI index. Thus, a base station may select an MCS for the downlink based on the CQI index reported by the UE. Similarly, a base station may select an MCS for the uplink (e.g., from among the same set of 15 MCSs) based on uplink channel conditions (e.g., determined by channel sounding).

The inventors have recognized, however, that it can be beneficial to use packet length as an additional factor in selecting an MCS. Specifically, benefits can result in cases when a conventionally-selected MCS would require a particular number of resource blocks to transmit a packet having a particular length and an alternative, lower-efficiency MCS would require the same number of resource blocks to transmit a packet having the particular length. In such cases, using the alternative, lower-efficiency MCS would result in a more robust transmission (i.e., with a lower average error rate) than the conventionally-selected MCS using the same quantity of air interface resources.

Using packet length as a factor in selecting an MCS can be particularly useful when voice data is to be transmitted to or from a UE. This is because many vocoders generate voice data at a particular rate such that the resulting packets of voice data each have a fixed length that can be calculated in advance. For example, adaptive multi-rate wideband (AMR-WB) vocoders are a class of vocoders that sample 20 millisecond voice frames at a 16 kHz sample rate and then encode the sampled voice data to provide voice coding rates ranging from 1.75 kbps to 23.85 kbps. With such AMR-WB vocoders, 12.65 kHz is a voice coding rate that is commonly used for voice over LTE (VoLTE) calls. An AMR-WB vocoder operating at a voice coding rate of 12.65 kHz generates 253 bits for every 20 millisecond voice frames that is sampled. Those 253 bits would be the payload of a VoLTE packet. The length of the packet header can also be calculated. For example, robust header compression (RoHC) is commonly used for VoLTE packets, and RoHC typically results in a compressed packet header of 24 bits. Thus, in this example, each VoLTE packet would include a payload of 253 bits and a packet header of 24 bits for a total length of 277 bits.

Table 1 below illustrates how different MCSs may require the same number of downlink resource blocks to transmit a VoLTE packet having a length of 277 bits. The first column in the table indicates the CQI index that a UE may report. The second and third columns identify the MCS that each CQI index maps to in terms of the modulation (second column) of the MCS and the efficiency (third column) of the MCS. As discussed above, the efficiency is the number of information bits per resource element after taking into account the type of modulation (which determines the total number of bits represented by a resource element) and the type of encoding that the MCS provides. The fourth column is the number of downlink link resource blocks that would be required to transmit a VoLTE packet having a length of 277 bits for an example implementation in which each downlink resource block has 138 resource elements available to carry user data (e.g., as shown below in FIG. 2B).

TABLE 1

| CQI Index | Modulation | Efficiency | Number of resource blocks required to transmit VoLTE packet of 277 bits |
|---|---|---|---|
| 1 | QPSK | 0.152 | 14 |
| 2 | QPSK | 0.234 | 9 |
| 3 | QPSK | 0.377 | 6 |
| 4 | QPSK | 0.602 | 4 |
| 5 | QPSK | 0.877 | 3 |
| 6 | QPSK | 1.176 | 2 |
| 7 | 16QAM | 1.477 | 2 |
| 8 | 16QAM | 1.914 | 2 |
| 9 | 16QAM | 2.406 | 1 |
| 10 | 64QAM | 2.730 | 1 |
| 11 | 64QAM | 3.322 | 1 |
| 12 | 64QAM | 3.902 | 1 |
| 13 | 64QAM | 4.523 | 1 |
| 14 | 64QAM | 5.115 | 1 |
| 15 | 64QAM | 5.555 | 1 |

In the example illustrated in Table 1, the MCSs corresponding to CQI Index 6, CQI Index 7, and CQI Index 8 all require two (2) resource blocks to transmit a VoLTE packet of 277 bits. Thus, if the UE reports the downlink channel conditions as a CQI Index of 8, the base station may initially select the corresponding MCS (16QAM, efficiency of 1.914). However, because a lower-efficiency MCS (16QAM, efficiency of 1.477) would require the same number of resource blocks for the VoLTE, the base station may select the lower-efficiency MCS instead of the MCS that the base station initially selected based on the downlink channel conditions reported by the UE. The base station may then allocate downlink resources to the UE for the VoLTE call using the lower-efficiency MCS and indicate the allocated resources and the lower-efficiency MCS to the UE. The allocated downlink resources could be, for example, two resource blocks based on the determination that two resource blocks would be required to transmit the VoLTE packet.

In some cases, the base station may go further and select the lowest-efficiency MCS that would require the same number of resources to transmit the VoLTE packet as the initially selected MCS. In the above example, in which the base station initially selects the MCS corresponding to CQI Index 8 based on the UE's report, the MCSs corresponding to CQI Index 7 and CQI Index 6 would both require the same number of resource blocks (two resource blocks) to transmit the VoLTE packet. However, the MCS corresponding to CQI Index 6 has a lower efficiency than the MCS corresponding to CQI Index 7. As a result, the base station may select the lowest-efficiency MCS (QPSK, efficiency of 1.176) corresponding to CQI Index 6 instead of the initially selected MCS (corresponding to CQI Index 8) and instead of the lower-efficiency MCS (corresponding to CQI Index 7). As indicated in Table 1, the MCSs that have an even lower efficiency than the MCS corresponding to CQI Index 6 would require more than two resource blocks to transmit the VoLTE packet.

By seeking the MCS with the lowest efficiency that would require the same number of resource blocks to transmit the VoLTE packet as the initially-selected MCS, the base station may select an MCS that has a much lower efficiency that the initially-selected MCS. For example, the UE may report the downlink channel conditions as CQI Index 15, and the base station may initially select the corresponding MCS (64QAM, efficiency of 5.555). That initially-selected MCS would require one (1) resource block to transmit a VoLTE packet of 277 bits. However, a number of lower-efficiency MCSs would also require one resource block to transmit a VoLTE packet of 277 bits. Of these, the MCS corresponding to CQI Index 9 (16QAM, efficiency of 2.406) has the lowest efficiency. Thus, the base station may select this lowest-efficiency MCS (corresponding to CQI Index 9) instead of the MCS (corresponding to CQI Index 15) that the base station initially selected based on the downlink channel conditions reported by the UE.

By selected a lower-efficiency MCS, or the lowest-efficiency MCS, that can transmit a packet of a particular length (e.g., a VoLTE packet) using the same number of resource blocks as an MCS that is initially selected based on channel conditions, the transmission of the packet can be made more robust without consuming additional air interface resources.

2. Example Network Architecture

For purposes of illustration, example embodiments will be described herein for a voice call using an LTE air interface protocol and network architecture. Thus, a voice-over-LTE (VoLTE) call is described herein as an example embodiment. It is to be understood, however, that other types of air interface protocols, network architectures, or voice calls could be used.

FIG. 1 illustrates a representative LTE network, which functions primarily to serve UEs with wireless packet data communication service, including VoLTE service, but may also provide other functions. As shown, the LTE network includes a representative LTE base station 22 known as an evolved Node B (eNodeB). The eNodeB has an antenna structure (e.g., patch, dipole, phased array, and/or other antenna arrangement) and associated equipment for providing LTE coverage in which to serve UEs such as an example UE 24.

In this example, eNodeB 22 has a communication interface with a mobility management entity (MME) 26, which may function as a signaling controller for the LTE network. Further, eNodeB 22 has a communication interface with a serving gateway (SGW) 28, which in turn has a communication interface with a packet-data network gateway (PGW) 30 that provides connectivity with a packet-switched network 32, and the MME 26 has a communication interface with the SGW 28. Also shown is a call server 33, which may function to set up, manage, and tear down, VoLTE calls through the packet-switched network 32. In practice, each of these entities may sit on a core packet network operated by a wireless service provider, and the communication interfaces between these entities may be logical packet-switched interfaces. Other arrangements are possible as well.

3. Example Air Interface Resources

FIG. 2A illustrates how the downlink resources in the coverage area of eNodeB 22 may be divided in time and frequency domains into resource blocks under LTE. In the time domain, each resource block occupies a 1 ms sub-frame. By way of example, FIG. 2A shows resource blocks 100-110 for a particular sub-frame. In the frequency domain, each of resource blocks 100-110 occupies a respective portion of frequency bandwidth, typically 180 kHz. Although FIG. 2A shows six resource blocks in each sub-frame, a wireless coverage area could have a greater number of resource blocks, as indicated by the dots above and below resource blocks 100-110. For instance, in a 5 MHz LTE carrier, a total of 25 resource blocks may span the bandwidth in each 1 ms sub-frame.

FIG. 2A also includes a more detailed view of downlink resource block 108. This detailed view shows that the 180 kHz of frequency bandwidth corresponds to 12 sub-carriers of 15 kHz each, and also shows that the 1 ms sub-frame corresponds to the duration of 14 OFDM symbols. Each OFDM symbol spans the 12 sub-carriers and includes a respective sub-carrier symbol on each sub-carrier. Thus, a downlink resource block may be described as a set of resource elements, with each resource element corresponding to a sub-carrier symbol that is carried on a particular sub-carrier for the duration of one OFDM symbol. The detailed view of downlink resource block 108 in FIG. 2A shows the division of the resource into multiple resource elements, such as resource element 108a.

Although FIG. 2A has been described for downlink resources, uplink resources are similarly divided into resource blocks and resource elements under LTE. Like the downlink resource block 108 illustrated in FIG. 2A, each uplink resource block spans occupies a 1 ms sub-frame and typically spans a 180 kHz of frequency bandwidth that corresponds to 12 sub-carriers of 15 kHz each.

Figure 2B:
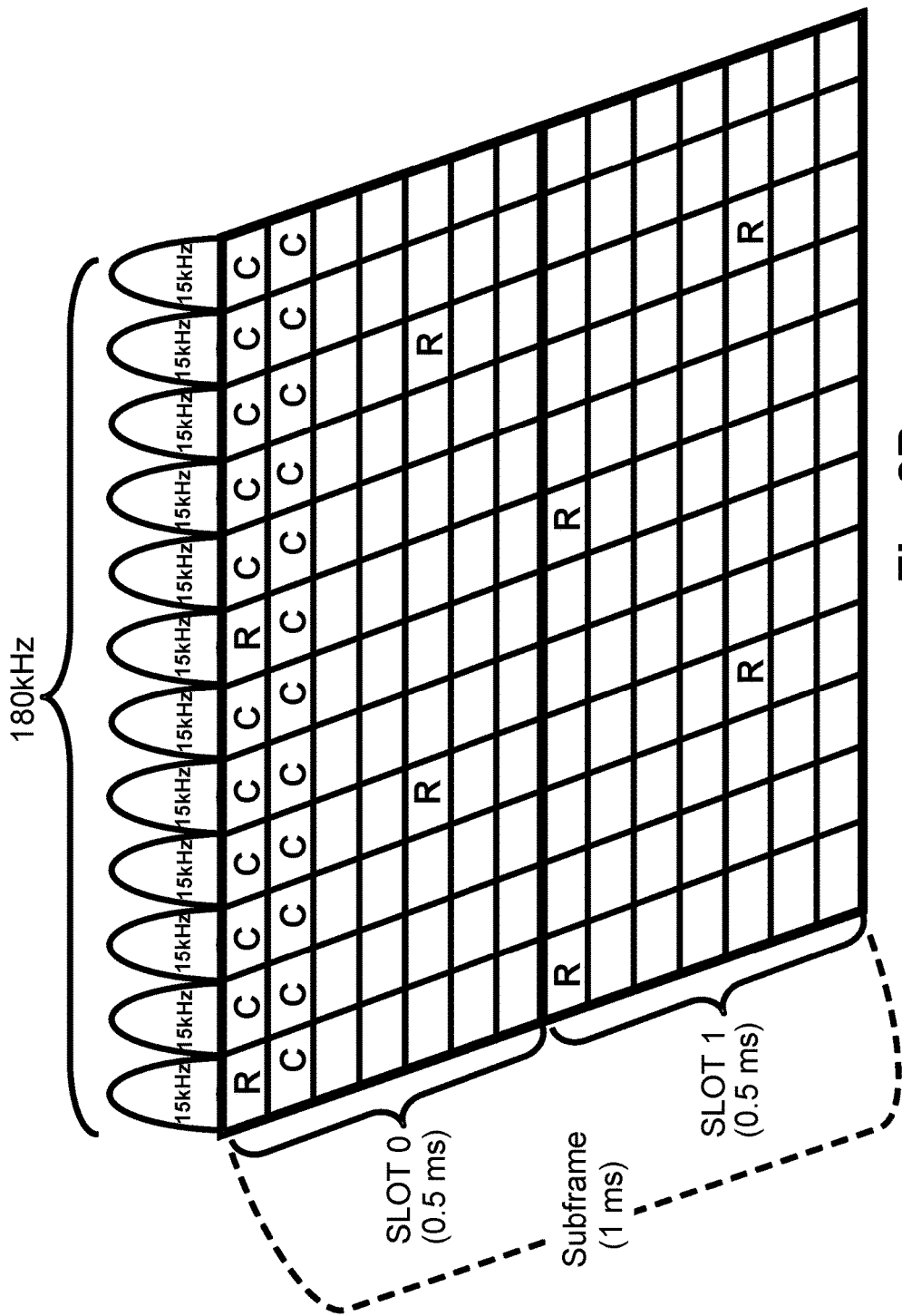
FIG. 2B is an illustration of a downlink resource block, in accordance with an example embodiment.

FIG. 2B illustrates the resource elements in a resource block spanning a 1 ms sub-frame (including Slot 0 and Slot 1) in more detail. Although the resource block includes 168 resource elements in total, some of these resource elements are reserved for particular functions. In this example, the resource block includes eight (8) resource elements that are labeled "R" to indicate that they are reserved for reference signals used for channel estimation. In addition, twenty-two (22) of the resource elements in the first two OFDM symbols are labeled "C" to indicate that they are used to transmit control signaling (e.g., corresponding to the PDCCH channel and other control channels). The 138 unlabeled resource elements in the resource block are available to transmit user data (i.e., corresponding to the PDSCH channel). It is to be understood that FIG. 2B illustrates only one possible configuration, and that a downlink resource block could have other configurations as well.

4. Example Methods

Figure 3:
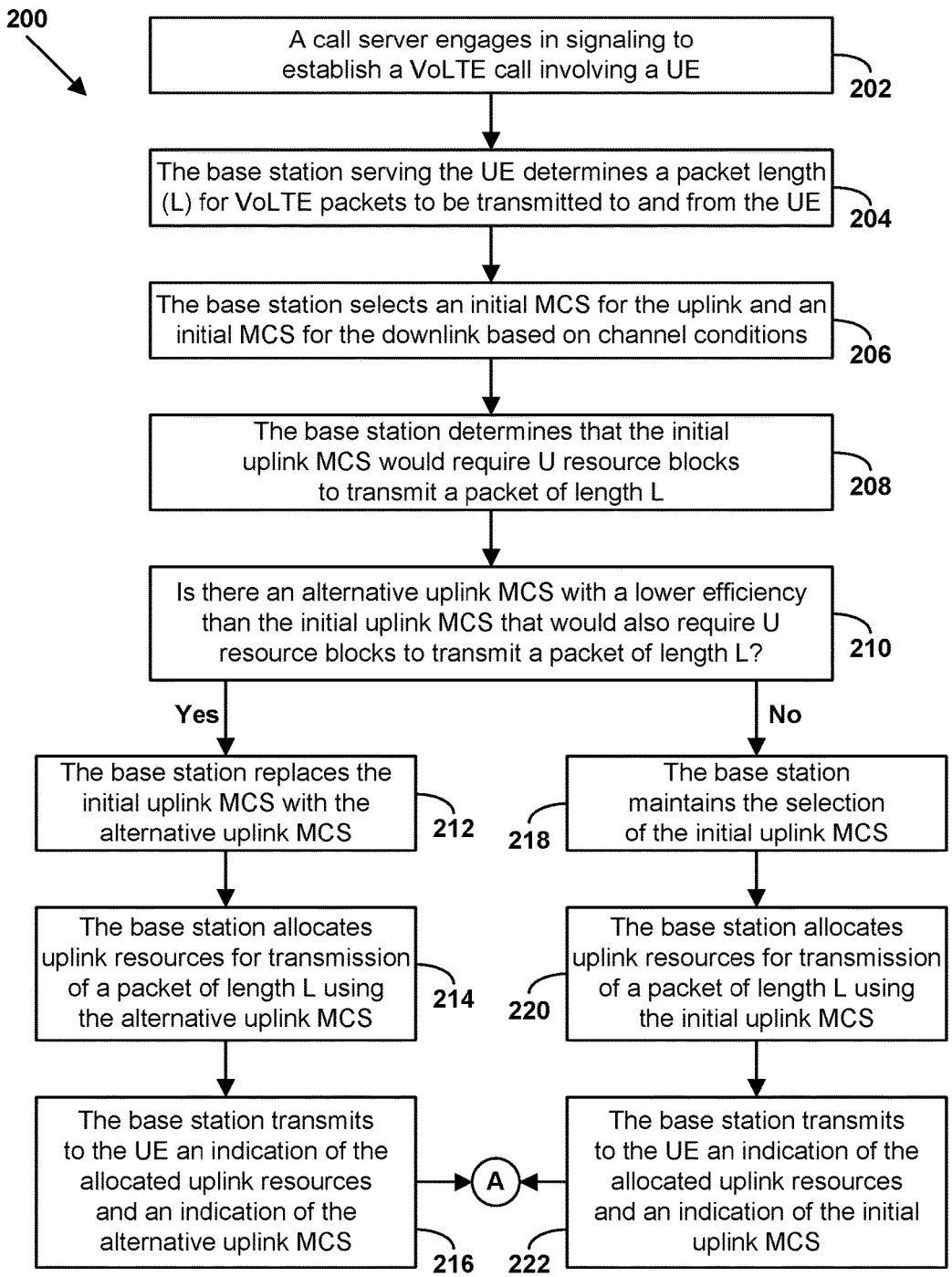
FIG. 3 is a flow chart illustrating a first part of an example method of selecting uplink and downlink MCSs, in accordance with the present disclosure.
Figure 4:
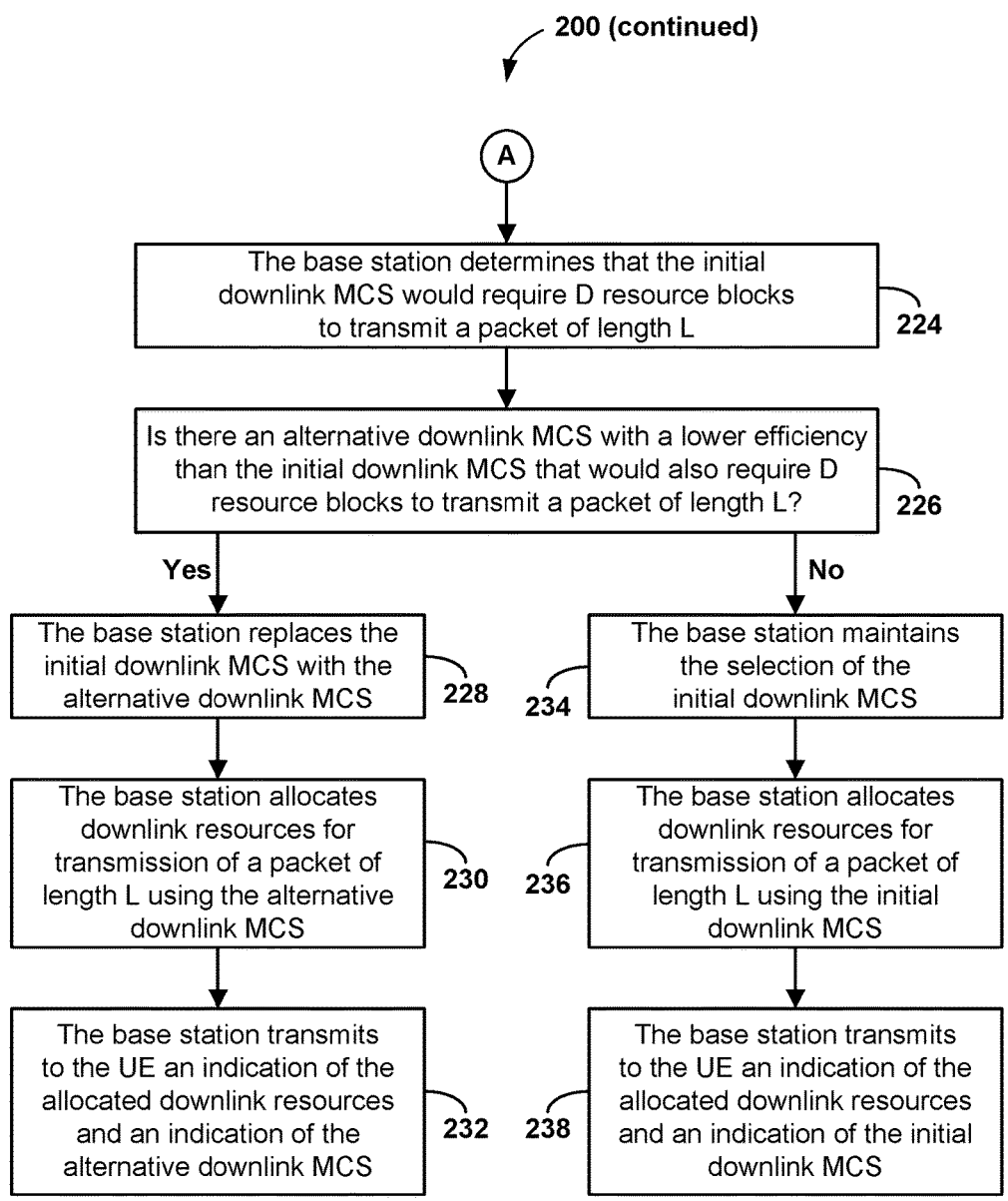
FIG. 4 is a flow chart illustrating a second part of the example method of selecting uplink and downlink MCSs of FIG. 3, in accordance with the present disclosure.

FIGS. 3 and 4 are flow charts illustrating an example method 200 for selecting uplink and downlink MCSs and allocating uplink and downlink resources that use the selected MCSs for a VoLTE call. Although FIGS. 3 and 4 illustrate the steps of the method 200 in a particular order, it is to be understood that the steps could be performed in a different order. It is also to be understood that some of the steps could be performed simultaneously or nearly simultaneously, some of the steps could be omitted, and additional steps could be included. Further, for purposes of illustration, FIGS. 3 and 4 are described with reference with to a LTE network architecture as shown in FIG. 1 and for the case of a VoLTE call. It is to be understood, however, that method 200 could be applied to other types of networks, air interface protocols, and/or communication sessions.

Method 200 begins when a call server (e.g., call server 33) engages in signaling to establish a VoLTE call involving a UE (e.g., UE 24), as indicated by block 202. The signaling could involve a request to originate a call from the UE. Alternatively, the signaling could involve a request from a calling party that desires to establish a voice call to the UE. In example embodiments, the request from the UE or calling party could be a Session Initiation Protocol (SIP) INVITE request. The SIP INVITE request could include a description, using the Session Description Protocol (SDP), of one or more vocoders and/or voice coding rates that are proposed for the call. In addition to the SIP INVITE request, the signaling indicated by block 202 could include further signaling to negotiate the selection of a particular vocoder and voice coding rate to use for the call. The further signaling could involve communications among one or more of the call server, the UE, the base station serving the UE (e.g., eNodeB 22), and the relevant MME (e.g., MME 26).

Once the vocoder and voice coding rate have been selected, the base station serving the UE (e.g., eNodeB 22) determines a packet length (L) of the VoLTE packets to be transmitted to and from the UE for the VoLTE call, as indicated by block 204. The base station may determine the packet length (L) based on the vocoder and voice coding rate selected for the VoLTE call and a type of header compression that is used for VoLTE packets. For example, if the vocoder selected for the VoLTE call is AMR-WB with a voice coding rate of 12.65 kbps, then the base station may determine that the payload of each VoLTE packet will be 253 bits based on the 12.65 kbps voice coding rate and the 20 ms voice frames that the AMR-WB vocoder uses. The base station may further determine that the length of the packet header will be 24 bits, for example, based on the type of header compression that is used (e.g., RoHC). Based on the packet header length of 253 bits and the packet header length of 24 bits, the base station may determine that the length of each VoLTE packet will be 277 bits.

The base station also selects an initial MCS for the uplink and an initial MCS for the downlink based on channel conditions, as indicated by block 206. The base station may determine the downlink channel conditions based on a CQI index reported by the UE, and the base station may select the initial MCS for the downlink based on a mapping between CQI Indexes and MCSs (e.g., as shown in Table 1). The base station may similarly select the initial MCS for the uplink based on a mapping between uplink channel conditions (e.g., determined based on channel sounding) and MCSs. By using such mappings, the initially selected MCS may be the MCS with the highest efficiency among the plurality of available MCSs for which the average error rate will be less than or equal to a maximum acceptable error rate given the channel conditions.

After selecting the initial MCSs for the uplink and the downlink, the base station determines whether a lower efficiency MCS could be used for the uplink and/or the downlink based on the packet length (L) of the VoLTE packets. The uplink determination is illustrated in FIG. 3. The downlink determination is illustrated in FIG. 4.

To make the determination for the uplink, the base station may first determine that the initial uplink MCS would require U resource blocks to transmit a packet of length L, as indicated by block 208. This determination can be based on the number of resource elements that are available in each uplink resource block to carry user data and the efficiency of the initial uplink MCS.

The base station then determines whether there is an alternative uplink MCS with a lower efficiency than the initial uplink MCS that would also require U resource blocks to transmit a packet of length L, as indicated by block 210. This determination can be based on the number of resource elements that are available in each uplink resource block to carry user data and the efficiencies of one or more lower efficiency MCSs that could be selected as an alternative to the initial uplink MCS.

If the base station determines that there is such an alternative uplink MCS, then the base station replaces the initial uplink MCS with the alternative uplink MCS, as indicated by block 212. The base station then allocates uplink resources for transmission of a packet of length L from the UE to the base station using the alternative uplink MCS, as indicated by block 214. The uplink resource allocation could be, for example, U resource blocks based on the determination that U resource blocks would be required to transmit a packet of length L. The base station transmits to the UE an indication of the allocated uplink resources and an indication of the alternative uplink MCS, as indicated by block 216. For example, the base station may use a Downlink Control Information (DCI) message to transmit these indications to the UE. The UE may then use the allocated uplink resources and alternative uplink MCS to transmit a VoLTE packet of length L to the base station.

If, on the other hand, the base station determines that there is no lower-efficiency MCS that would also require U resource blocks to transmit a packet of length L (e.g., all of the lower-efficiency MCSs would require more than U resource blocks to transmit a packet of length L), then the base station maintains the selection of the initial uplink MCS, as indicated by block 218. The base station then allocates uplink resources for transmission of a packet of length L from the UE to the base station using the initial uplink MCS, as indicated by block 220. The uplink resource allocation could be, for example, U resource blocks based on the determination that U resource blocks would be required to transmit a packet of length L. The base station transmits to the UE (e.g., in a DCI message) an indication of the allocated uplink resources and an indication of the initial uplink MCS, as indicated by block 222. The UE may then use the allocated uplink resources and initial uplink MCS to transmit a VoLTE packet of length L to the base station.

Turning to FIG. 4, the base station may perform similar steps for the downlink. The base station may first determine that the initial downlink MCS would require D resource blocks to transmit a packet of length L, as indicated by block 224. This determination can be based on the number of resource elements that are available in each downlink resource block to carry user data and the efficiency of the initial downlink MCS.

The base station then determines whether there is an alternative downlink MCS with a lower efficiency than the initial downlink MCS that would also require D resource blocks to transmit a packet of length L, as indicated by block 226. This determination can be based on the number of resource elements that are available in each downlink resource block to carry user data and the efficiencies of one or more lower efficiency MCSs that could be selected as an alternative to the initial downlink MCS.

If the base station determines that there is such an alternative downlink MCS, then the base station replaces the initial downlink MCS with the alternative downlink MCS, as indicated by block 228. The base station then allocates downlink resources for transmission of a packet of length L from the base station to the UE using the alternative uplink MCS, as indicated by block 230. The downlink resource allocation could be, for example, D resource blocks based on the determination that D resource blocks would be required to transmit a packet of length L. The base station transmits to the UE (e.g., in a DCI message) an indication of the allocated downlink resources and an indication of the alternative downlink MCS, as indicated by block 232. The base station may then use the allocated downlink resources and alternative downlink MCS to transmit a VoLTE packet of length L to the UE.

If, on the other hand, the base station determines that there is no lower-efficiency MCS that would also require D resource blocks to transmit a packet of length L (e.g., all of the lower-efficiency MCSs would require more than D resource blocks to transmit a packet of length L), then the base station maintains the selection of the initial downlink MCS, as indicated by block 234. The base station then allocates downlink resources for transmission of a packet of length L from the base station to the UE using the initial downlink MCS, as indicated by block 236. The downlink resource allocation could be, for example, D resource blocks based on the determination that D resource blocks would be required to transmit a packet of length L. The base station transmits to the UE (e.g., in a DCI message) an indication of the allocated downlink resources and an indication of the initial downlink MCS, as indicated by block 238. The base station may then use the allocated downlink resources and initial downlink MCS to transmit a VoLTE packet of length L to the UE.

It is to be understood that portions of method 200 could be performed multiple times during a VoLTE call to enable the UE to transmit multiple VoLTE packets to the base station and to enable the base station to transmit multiple VoLTE packets to the UE. The uplink and/or downlink MCSs that are used for the transmissions may change during the course of a VoLTE call, for example, because of changing uplink and/or downlink channel conditions. It is also possible that the length of VoLTE packet could change during the course of a VoLTE call, for example, because of a change in vocoder and/or voice coding rate. In response to a change in uplink channel conditions, downlink channel conditions, and or VoLTE packet length, the base station may re-evaluate the possibility of using an alternative MCS for the uplink and/or downlink.

Figure 5:
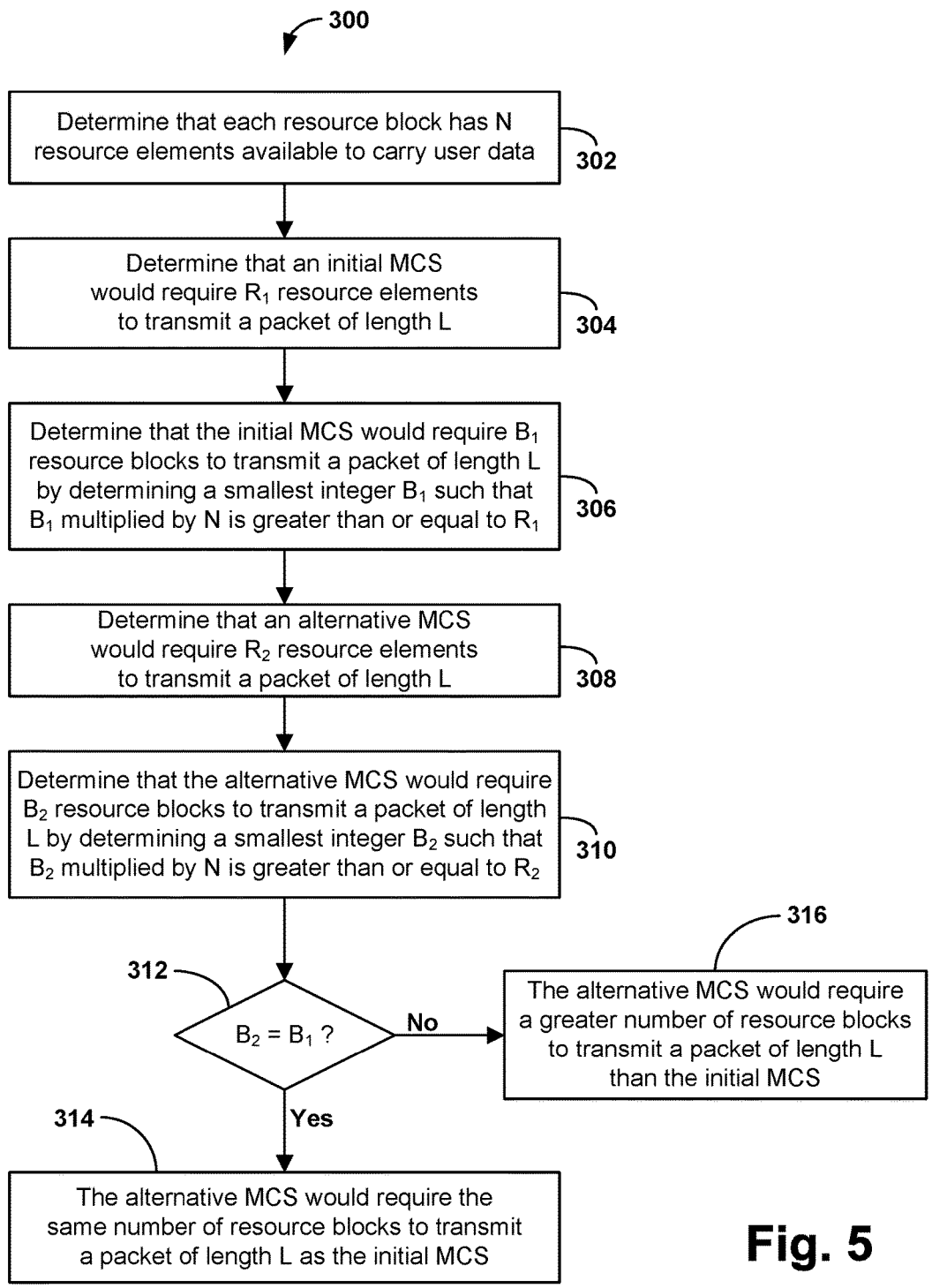
FIG. 5 is a flow chart illustrating an example method of comparing the number of resource blocks that would be required to transmit a packet of length L when using an initial MCS and when using an alternative MCS, in accordance with the present disclosure.

In method 200 discussed above for FIGS. 3 and 4, the base station determines that an initial MCS would require a particular number of resource blocks (e.g., U uplink resource blocks or D downlink resource blocks) to transmit a packet of length L and then determines whether an alternative MCS with a lower efficiency than the initial MCS would also require this particular number of resource blocks to transmit a packet of length L. FIG. 5 illustrates an example method 300 that could be used by a base station (or other network entity) to make these determinations for the uplink and/or downlink.

Example method 300 begins with determining that each resource block has N resource elements available to carry user data, as indicated by block 302. For example, a downlink resource block that has a total of 168 resource elements might have only 138 resource elements available to carry user data, as discussed above for FIG. 2B.

Example method 300 may then determine that an initial MCS (e.g., an MCS selected for the uplink or downlink based on channel conditions) would require $R_1$ resource elements to transmit a packet of length L, as indicated by block 304. The calculation of $R_1$ could be based on the efficiency, $E_1$, of the initial MCS. With $E_1$ given in terms of information bits per resource element, then $R_1$, the number of resource elements required to transmit L bits, can be calculated by dividing L by $E_1$ and rounding up to the nearest integer. For example, transmitting a VoLTE packet having a length of 277 bits (the packet length discussed above with reference to Table 1), using an MCS with an efficiency of 1.914 (the MCS corresponding to CQI Index 8 in Table 1) would require 145 resource elements.

Next, the method may determine that the initial MCS would require $B_1$ resource blocks to transmit a packet of length L by determining a smallest integer $B_1$ such that $B_1$ multiplied by N is greater than or equal to $R_1$, as indicated by block 306. For the above example in which $R_1$=145, and assuming that N=138, then the smallest integer $B_1$ would be 2. In this example, one resource block would not be enough to transmit the packet because only 138 resource elements in each resource block are available to carry user data.

Example method 300 may then evaluate one or more alternative MCSs that have a lower efficiency than the initial MCS. To perform this evaluation, the method may first determine that an alternative MCS (i.e., an MCS that has a lower efficiency than the initial MCS) would require $R_2$ resource elements to transmit a packet of length L, as indicated by block 308. The calculation of $R_2$ could be based on the efficiency, $E_2$, of the alternative MCS. With $E_2$ given in terms of information bits per resource element, then $R_2$, the number of resource elements required to transmit L bits, can be calculated by dividing L by $E_2$ and rounding up to the nearest integer. For example, transmitting a VoLTE packet having a length of 277 bits, using an MCS with an efficiency of 1.477 (the MCS corresponding to CQI Index 7 in Table 1) would require 188 resource elements.

Next, the method may determine that the alternative MCS would require $B_2$ resource blocks to transmit a packet of length L by determining a smallest integer $B_2$ such that $B_2$ multiplied by N is greater than or equal to $R_2$, as indicated by block 310. For the above example in which $R_2$=188, and assuming that N=138, then the smallest integer $B_2$ would be 2.

The integers $B_1$ and $B_2$ may then be compared to determine whether they are equal, as indicated by block 312. If $B_2$=$B_1$, then the method may determine that the alternative MCS would require the same number of resource blocks to transmit a packet of length L as the initial MCS, as indicated by block 314. As a result, the base station may replace the initial MCS with the alternative MCS and allocate uplink or downlink resources using the alternative MCS, for example, as discussed above with reference to blocks 212-216 shown in FIG. 3 or blocks 228-232 shown in FIG. 4.

If, on the other hand, $B_2$>$B_1$, then the method may determine that the alternative MCS would require a greater number of resource blocks to transmit a packet of length L than the initial MCS, as indicated by block 316. As a result, the base station may maintain the selection of the initial MCS and allocate uplink or downlink resources using the initial MCS, for example, as discussed above with reference to blocks 218-222 shown in FIG. 3 or blocks 234-238 shown in FIG. 4.

Once the method has determined that the alternative MCS would require the same number of resource blocks (i.e., $B_1$ resource blocks) to transmit a packet of length L as the initial MCS (block 314), the method may determine whether there is an MCS with an even lower efficiency than the alternative MCS that can also transmit a packet of length L in $B_1$ resource blocks. In some implementations, the method may determine the lowest-efficiency MCS that would require $B_1$ resource blocks to transmit a packet of length L. The lowest-efficiency MCS can be determined, for example, by sequentially evaluating MCSs with lower and lower efficiencies until the method finds an MCS that would require more than $B_1$ resource blocks to transmit a packet of length L. The MCS with the lowest efficiency in the sequence that would still be able to transmit the packet of length L in $B_1$ resource blocks would then be the lowest-efficiency MCS.

5. Example Base Station

Figure 6:
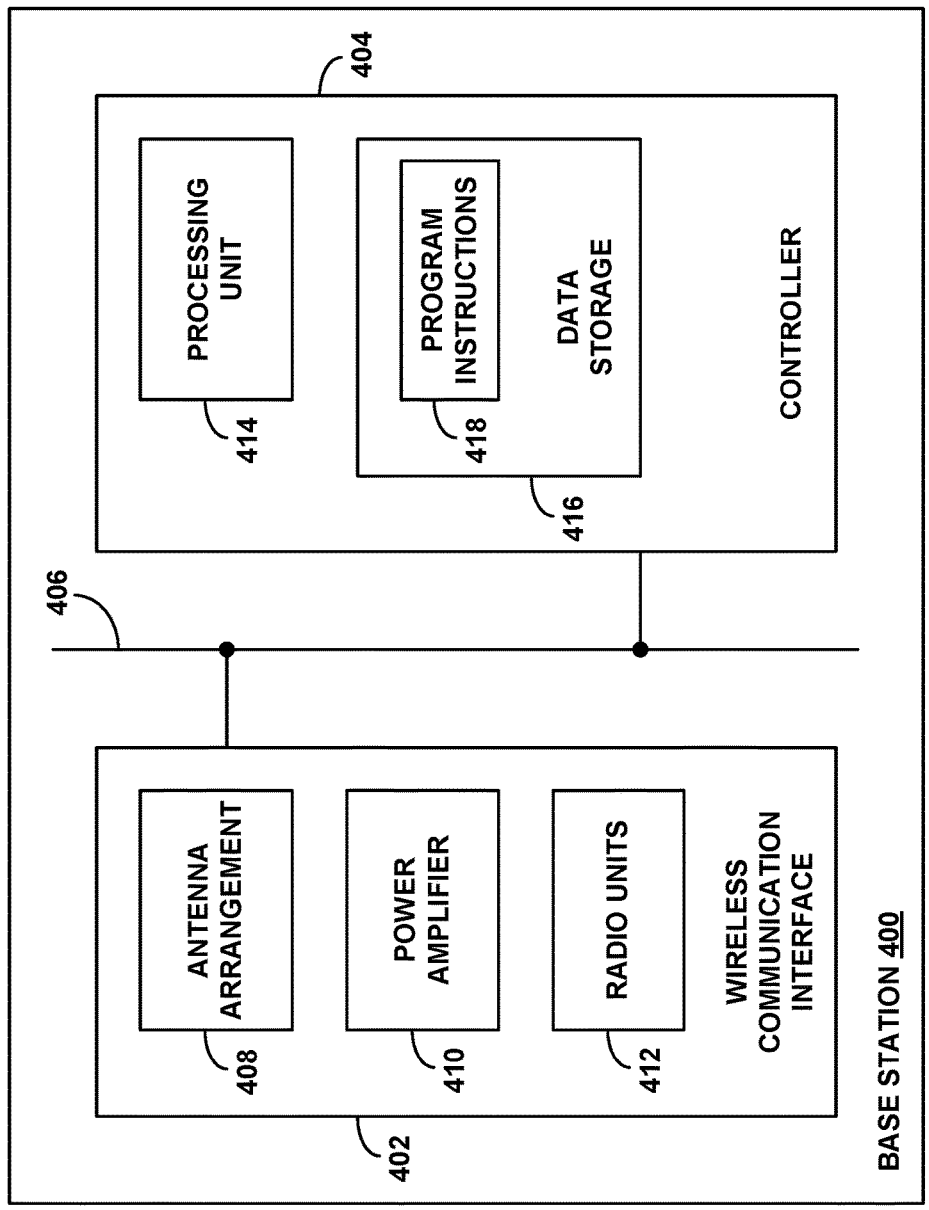
FIG. 6 is simplified block diagram of an example base station, in accordance with the present disclosure.

FIG. 6 is a simplified block diagram of a representative base station 400, such as eNodeB 22, depicting some of the components that can be included in such an entity. Base station 400 could take various forms, such as a macro base station having a tall antenna tower and power amplifier to provide a wide range of coverage, or a small base station (such as a picocell, femtocell, small cell, mini macro base station, relay base station, mobile hotspot, or the like), having a smaller form factor and lower power and thus providing a relatively smaller range of coverage. As shown in FIG. 2, the representative base station 400 may include, among other elements, a wireless communication interface 402 and a controller 404, which may be integrated together or communicatively linked together by a system bus, network, or other connection mechanism 406.

As shown, wireless communication interface 402 may include an antenna arrangement 408, which may be tower mounted or provided in another form, and associated components such as a power amplifier 410 and one or more radio units 412 for engaging in air interface communication with UEs via the antenna arrangement 408, so as to transmit user data and control signaling to the UEs and to receive user data and control signaling from the UEs.

Controller 404 may include a processing unit 414 (e.g., one or more general purpose and/or special purpose processors) and non-transitory data storage 416 (e.g., one or more volatile and/or non-volatile storage components such as magnetic, optical, flash or other storage, possibly integrated in whole or in part with the processing unit). Data storage 416 may store program instructions 418, which may be executable by one or more processors in processing unit 414 to carry out or cause to be carried out any of the operations described herein, such as the operations described herein with reference to FIGS. 3, 4, and 5. Although the controller 404 is shown within the base station 400, some or all of the control functionality could alternatively be provided external to the base station 400, such as by another entity in the network.

6. Conclusion

Exemplary embodiments have been described above. Those skilled in the art will understand, however, that changes and modifications may be made to these embodiments without departing from the true scope and spirit of the invention.

What is claimed is:

1. A method for wireless communication using one or more resource blocks, wherein each resource block corresponds to a block of frequencies and time and has N resource elements available to carry user data, the method comprising:
   determining that one or more packets to be transmitted to or from a user equipment device (UE) will each have a particular packet length by determining that each of the one or more packets will have a packet payload length and a packet header length and determining the particular packet length based on the packet payload length and the packet header length;
   selecting, from among a plurality of modulation and coding schemes (MCSs), an initial MCS for transmission of the one or more packets having the particular packet length based on channel conditions, wherein each MCS in the plurality of MCSs has a different efficiency with respect to information bits per resource element;
   making an initial determination that the initial MCS would require a particular number of resource blocks to transmit a packet having the particular packet length, wherein the initial determination comprises:
      determining that the initial MCS would require $R_1$ resource elements to transmit a packet having the particular packet length; and
      determining that the initial MCS would require $B_1$ resource blocks to transmit a packet of the particular packet length by determining a smallest integer $B_1$ such that $B_1$ multiplied by N is greater than or equal to $R_1$;
   making a subsequent determination that an alternative MCS in the plurality of MCSs that has a lower efficiency than the initial MCS would also require the particular number of resource blocks to transmit a packet having the particular packet length, wherein the subsequent determination comprises:
      determining that the alternative MCS would require $R_2$ resource elements to transmit a packet having the particular packet length, wherein $R_2$ is greater than $R_1$;
      determining that the alternative MCS would require $B_2$ resource blocks to transmit a packet of the particular packet length by determining a smallest integer $B_2$ such that $B_2$ multiplied by N is greater than or equal to $R_2$; and
      determining that $B_2$ is equal to $B_1$;
   after selecting the initial MCS and in response to the subsequent determination, replacing the initial MCS with the alternative MCS for transmission of the one or more packets having the particular packet length;
   allocating one or more resource blocks for transmission of the one or more packets having the particular packet length using the alternative MCS; and
   transmitting to the UE an indication of the allocated one or more resource blocks and an indication of the alternative MCS.

2. The method of claim 1, wherein selecting the initial MCS for transmission of the one or more packets having the particular packet length based on channel conditions comprises selecting the initial MCS for transmission of the one or more packets from a base station to the UE based on downlink channel conditions.

3. The method of claim 2, further comprising:
   transmitting, by the base station to the UE, the one or more packets having the particular packet length in the allocated one or more resource blocks using the alternative MCS.

4. The method of claim 1, wherein selecting the initial MCS for transmission of the one or more packets having the particular packet length based on channel conditions comprises selecting the initial MCS for transmission of the one or more packets from the UE to a base station based on uplink channel conditions.

5. The method of claim 4, further comprising:
   receiving, by the base station from the UE, the one or more packets having the particular packet length in the allocated one or more resource blocks using the alternative MCS.

6. The method of claim 1, wherein determining that one or more packets to be transmitted to or from the UE will each have the particular packet length comprises:
   determining that voice data is to be transmitted to or from the UE;
   determining that a particular vocoder is to be used to generate the voice data; and
   determining the particular packet length based on the particular vocoder.

7. The method of claim 6, wherein determining the particular packet length based on the particular vocoder comprises:
   determining that the particular vocoder has a voice coding rate; and
   determining the packet payload length based on the voice coding rate of the particular vocoder.

8. The method of claim 6, further comprising:
   receiving call setup signaling for a voice call involving the UE, wherein the determining that voice data is to be transmitted to or from the UE and the determining that a particular vocoder is to be used to generate the voice data are based on the call setup signaling.

9. The method of claim 1, wherein the alternative MCS is the lowest-efficiency MCS in the plurality of MCSs that would require the particular number of resource blocks to transmit a packet having the particular packet length.

10. The method of claim 1, wherein the particular packet length is L bits, wherein the initial MCS has an efficiency that provides $E_1$ information bits per resource element, wherein the alternative MCS has an efficiency that provides $E_2$ information bits per resource element, and wherein $E_2$ is less than $E_1$.

11. The method of claim 10, wherein determining that the initial MCS would require $R_1$ resource elements to transmit a packet having the particular packet length comprises determining $R_1$ based on L and $E_1$, and wherein determining that the alternative MCS would require $R_2$ resource elements to transmit a packet having the particular packet length comprises determining $R_2$ based on L and $E_2$.

12. A system for wireless communication using one or more resource blocks, wherein each resource block corresponds to a block of frequencies and time and has N resource elements available to carry user data, the system comprising:
   a wireless communication interface;
   one or more processors; and
   data storage that stores program instructions executable by the one or more processors to cause the system to perform operations comprising:
   determining that one or more packets to be transmitted to or from a user equipment device (UE) will each have a particular packet length by determining that each of the one or more packets will have a packet payload length and a packet header length and determining the particular packet length based on the packet payload length and the packet header length;
   selecting, from among a plurality of modulation and coding schemes (MCSs), an initial MCS for transmission of the one or more packets having the particular packet length based on channel conditions, wherein each MCS in the plurality of MCSs has a different efficiency with respect to information bits per resource element;
   making an initial determination that the initial MCS would require a particular number of resource blocks to transmit a packet having the particular packet length, wherein the initial determination comprises:
      determining that the initial MCS would require $R_1$ resource elements to transmit a packet having the particular packet length; and
      determining that the initial MCS would require $B_1$ resource blocks to transmit a packet of the particular packet length by determining a smallest integer $B_1$ such that $B_1$ multiplied by N is greater than or equal to $R_1$;
   making a subsequent determination that an alternative MCS in the plurality of MCSs that has a lower efficiency than the initial MCS would also require the particular number of resource blocks to transmit a packet having the particular packet length, wherein the subsequent determination comprises:
      determining that the alternative MCS would require $R_2$ resource elements to transmit a packet having the particular packet length, wherein $R_2$ is greater than $R_1$;
      determining that the alternative MCS would require $B_2$ resource blocks to transmit a packet of the particular packet length by determining a smallest integer $B_2$ such that $B_2$ multiplied by N is greater than or equal to $R_2$; and
      determining that $B_2$ is equal to $B_1$;
   after selecting the initial MCS and in response to the subsequent determination, replacing the initial MCS with the alternative MCS for transmission of the one or more packets having the particular packet length;
   allocating one or more resource blocks for transmission of the one or more packets having the particular packet length using the alternative MCS; and
   transmitting to the UE, via the wireless communication interface, an indication of the allocated one or more resource blocks and an indication of the alternative MCS.

13. The system of claim 12, wherein the alternative MCS is the lowest-efficiency MCS in the plurality of MCSs that would require the particular number of resource blocks to transmit a packet having the particular packet length.

14. The system of claim 12, wherein the particular packet length is L bits, wherein the initial MCS has an efficiency that provides $E_1$ information bits per resource element, wherein the alternative MCS has an efficiency that provides $E_2$ information bits per resource element, and wherein $E_2$ is less than $E_1$.

15. The system of claim 14, wherein determining that the initial MCS would require $R_1$ resource elements to transmit a packet having the particular packet length comprises determining $R_1$ based on L and $E_1$, and wherein determining that the alternative MCS would require $R_2$ resource elements to transmit a packet having the particular packet length comprises determining $R_2$ based on L and $E_2$.

* * * * *